United States Patent
Bush

Patent Number: 6,119,112
Date of Patent: Sep. 12, 2000

[54] OPTIMUM CESSATION OF TRAINING IN NEURAL NETWORKS

[75] Inventor: Ronald Roscoe Bush, Austin, Tex.

[73] Assignee: International Business Machines Corporation, Armonk, N.Y.

[21] Appl. No.: 08/974,122

[22] Filed: Nov. 19, 1997

[51] Int. Cl.[7] .................................................. G06N 3/08
[52] U.S. Cl. .............................................. 706/25; 706/26
[58] Field of Search ......................................... 706/25, 26

[56] References Cited

U.S. PATENT DOCUMENTS 5,461,699   10/1995   Arbabi et al. .

OTHER PUBLICATIONS

"Practical Neural Network Recipes in C++"; by Timothy Masters; edition (Apr. 1993); Academic Pr; ISBN: 0124790402.

NeuroShell® 2; Ward Systems Group, Inc.; www.wardsystems.com, 1993.

*Primary Examiner*—Tariq R. Hafiz
*Assistant Examiner*—Edward G. Brown
*Attorney, Agent, or Firm*—Marilyn Smith Dawkins; Mark S. Walker

[57] ABSTRACT

A system and method for training a neural network that ceases training at or near the optimally trained point is presented. A neural network having an input layer, a hidden layer, and an output layer with each layer having one or more nodes is presented. Each node in the input layer is connected to each node in the hidden layer and each node in the hidden layer is connected to each node in the output layer. Each connection between nodes has an associated weight. All nodes in the input layer are connected to a different historical datum from the set of historical data. The neural network being operative by outputting a prediction or classification, the output of the output layer nodes, when presented with input data. The weights associated with the connections of the neural network are first adjusted by a training device. The training device then iteratively applies a training set to the neural network, the training set consisting of historical data. After each iteration the weights associated with the connections are adjusted according to the difference between the prediction or classification produced by the neural network given the training data and the known prediction or classification of the historical data. Additionally, after each iteration, a test set, consisting of different historical data from that in the training set, is presented to the neural network. The training device then determines the difference between the known result from the test set and the result from the presentation of the test set to the neural network. This difference, herein referred to as the variance, is then recorded along with the weights in the neural network. The variance is monitored at each iteration to determine if it is monotonically, within a given margin of error, decreasing. That is the prediction or classification resulting from the test set being presented to the neural network is getting successively closer to matching the known result from the test set. When the variance hits the inflection point where it begins to increase, training is ceased. At this point the neural network is no longer learning the pattern underlying the input data, but is instead over fitting the input data.

4 Claims, 9 Drawing Sheets

OPTIMUM CESSATION OF TRAINING IN NEURAL NETWORKS

BACKGROUND OF THE INVENTION

1. Field of the Invention

The present invention relates to a system and method for ceasing the training of neural networks at or near the optimal training point. In particular the invention applies a test set to the neural network after each training iteration in order to determine when the neural network is no longer learning the underlying pattern in the data, but is instead fitting the noise in the training set.

2. Description of the Prior Art

Any organization, whether commercial, charitable, not for profit, or governmental needs to plan its future activities. Planning necessarily requires estimation of future needs and demands. Thus, prediction and classification plays an important role in the planning process of any organization. The ability to accurately predict future conditions and needs is critical to the survival of many organizations. These organizations rely on predictions and classifications so that they can allocate resources efficiently, balance workload against the predicted demand and plan their operations to meet the needs and demands that will be placed upon them.

Most organizations require forecasts of volumes which are affected by historical trends over a wide variety of variables. Any entitlement program, service organization or sales force faces requirements for workload balancing based on projections of the number of customers or the volume of orders. These kinds of predictions are typically dependent on trends in customer behavior. As a result, these organizations are increasingly adopting Customer Relationship Management programs, in which they are frequently called upon to classify how customers are likely to respond to a given offer.

These prediction and classification problems are typically solved using neural networks. One of the characteristics of neural networks is the frequent requirement to have to train the networks for long periods of time. Currently, neural networks are commonly trained to the point where the average sum-squared error on the training set is reduced to a given level, or a predetermined number of iterations has been exceeded. Thus, there has been a long existing need in the art to dynamically determine the point at which further training no longer makes any improvement in the predictive or classification ability of the neural network. Aside from the improvement in training time, there has also been a long existing need in the art to know what the variance of the optimal fit to the known test set is for a given network architecture. Knowing this value greatly reduces the time spent in trial and error tuning of the neural network.

SUMMARY OF THE INVENTION

The above-mentioned, long existing needs have been met in accordance with the present invention disclosing a method and apparatus for ceasing the training of neural networks at or near their optimal training point It is therefore one objective of the present invention to provide an improved method and apparatus for dynamically determining the point in neural network training where further training no longer produces an improvement in the predictive or classification ability of the neural network, i.e. the point where the network is no longer learning the pattern in the data but is over fitting the data by learning the noise in the data.

It is yet another objective of the present invention to provide a method and apparatus for producing the optimal neural network for a given testing set.

It is yet another objective of the present invention to provide a method and apparatus for improving the neural network developer's understanding of the effect on the predictive or classification ability of a given neural network architecture.

It is yet another object of the present invention to provide a means whereby, for a given neural network architecture, the variance associated with the optimal fit to a known test set, can be readily determined.

To quickly understand how this is achieved, assume as given a neural network architecture(s) having an input layer, some number of hidden layers, and an output layer, each layer having one or more nodes, and all nodes in the input layer connected to a different historical datum from the set of historical data, with each node in the input layer connected to each node in the first, and possibly only, hidden layer, and each node in the first hidden layer connected to each node in the next hidden layer, if it exists, and each node in the last hidden layer connected to each node in the output layer, the output layer outputting a prediction or classification, and each connection between nodes having an associated weight and a training means for determining the weights for each of the connections of the neural network.

The training means applies a training set to the neural network in an iterative manner, the training set consisting of historical data, after each iteration the training means determines a difference between the prediction or classification produced by the neural network and the prediction or classification from the known training data. The training means then adjusts the weights of the neural network based on the difference. The error assigned to each node in the network may be assigned by the training means via the use of back propagation.

The above-mentioned long existing needs have been met in accordance with a preferred embodiment of the present invention by executing the following process after each training iteration:

Saving the neural network weights, indexed by iteration number;

Testing the neural network on the test set, which is historical data separate from the historical data in the training set;

Calculating the difference, which is herein referred to as the variance, between the prediction or classification produced by the neural network on the test set and the known prediction or classification from the test set data itself.

Saving the iteration number and current variance when the current variance is less than any preceding variance;

Monitoring the variance until it has been determined that the variance is increasing instead of decreasing.

At the point where it has been determined, within some predetermined margin of error, that the variance is increasing, cessation of training occurs. The iteration number, at which the lowest value of the variance was achieved, is then utilized to retrieve the optimal set of neural network weights. The variance between the optimal fit to the test set and the known result from the test set can either be obtained by applying the optimal set of neural network weights to the test set or by retrieving the variance from storage, if it has been previously stored by the training means during the iterative process.

The above as well as additional objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects, aspects and advantages thereof, will be best understood from the following detailed description of an illustrative embodiment when read in conjunction with the accompanying drawings, wherein:

DETAILED DESCRIPTION OF THE PREFERRED EMBODIMENT DEFINITIONS

"Node" a single neuron-like computational element in a neural network.

"Weight" an adjustable value or parameter associated with a connection between nodes in a network. The magnitude of the weight determines the intensity of the connection. Negative weights inhibit node firing while positive weights enable node firing.

"Connection" are pathways between nodes, that correspond to the axons and synapses of neurons in the human brain, that connect the nodes into a network.

"Learning Law" an equation that modifies all or some of the weights in a node's local memory in response to input signals and the values supplied by the activation function. The equation enables the neural network to adapt itself to examples of what it should be doing and to organize information within itself and thereby learn. Learning laws for weight adjustment can be described as supervised learning or unsupervised learning or reinforcement learning. Supervised learning assumes that the desired output of the node is known or can be determined from an overall error. This is then used to form an error signal which is used to update the weights. In unsupervised learning the desired output is not known and learning is based on input/output values. In reinforcement learning the weights associated with a node are not changed in proportion to the output error associated with a particular node but instead are changed in proportion to some type of global reinforcement signal.

"Activation function" or "Transfer function" a formula that determines a node's output signal as a function of the most recent input signals and the weights in local memory.

"Back propagation" in a neural network is the supervised learning method in which an output error signal is fed back through the network, altering connection weights so as to minimize that error.

"Input layer" the layer of nodes that forms a passive conduit for entering a neural network.

"Hidden layer" a layer of nodes not directly connected to a neural network's input or output.

"Output layer" a layer of nodes that produce the neural network's results.

"Optimum Training Point" is that point in the training of a neural network where the variance of the neural network prediction or classification has reached a minimum with respect to known results from a test set taken from historical data.

Overview

Figure 1:
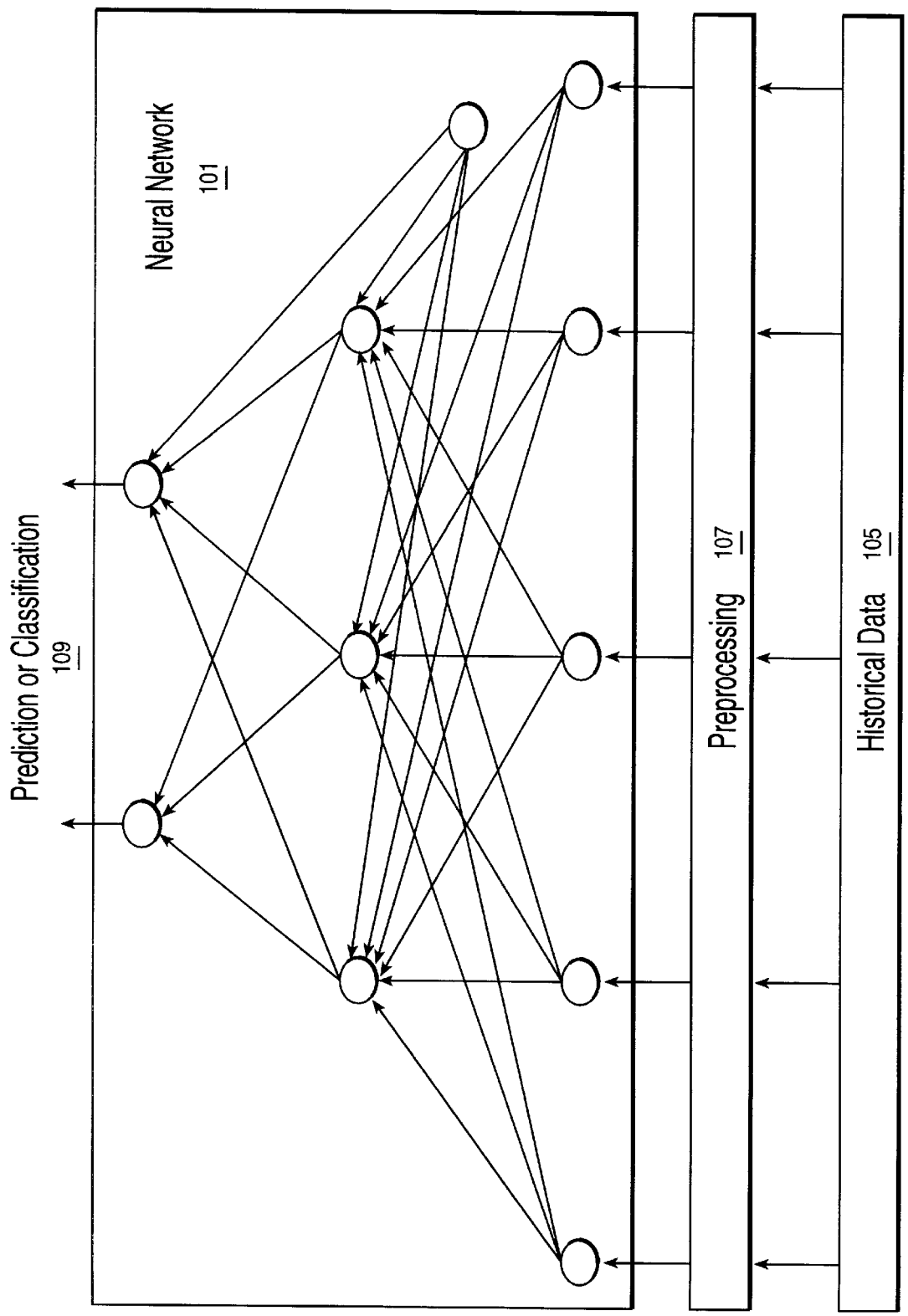
FIG. 1 is a functional overview of the present invention.
Figure 2:
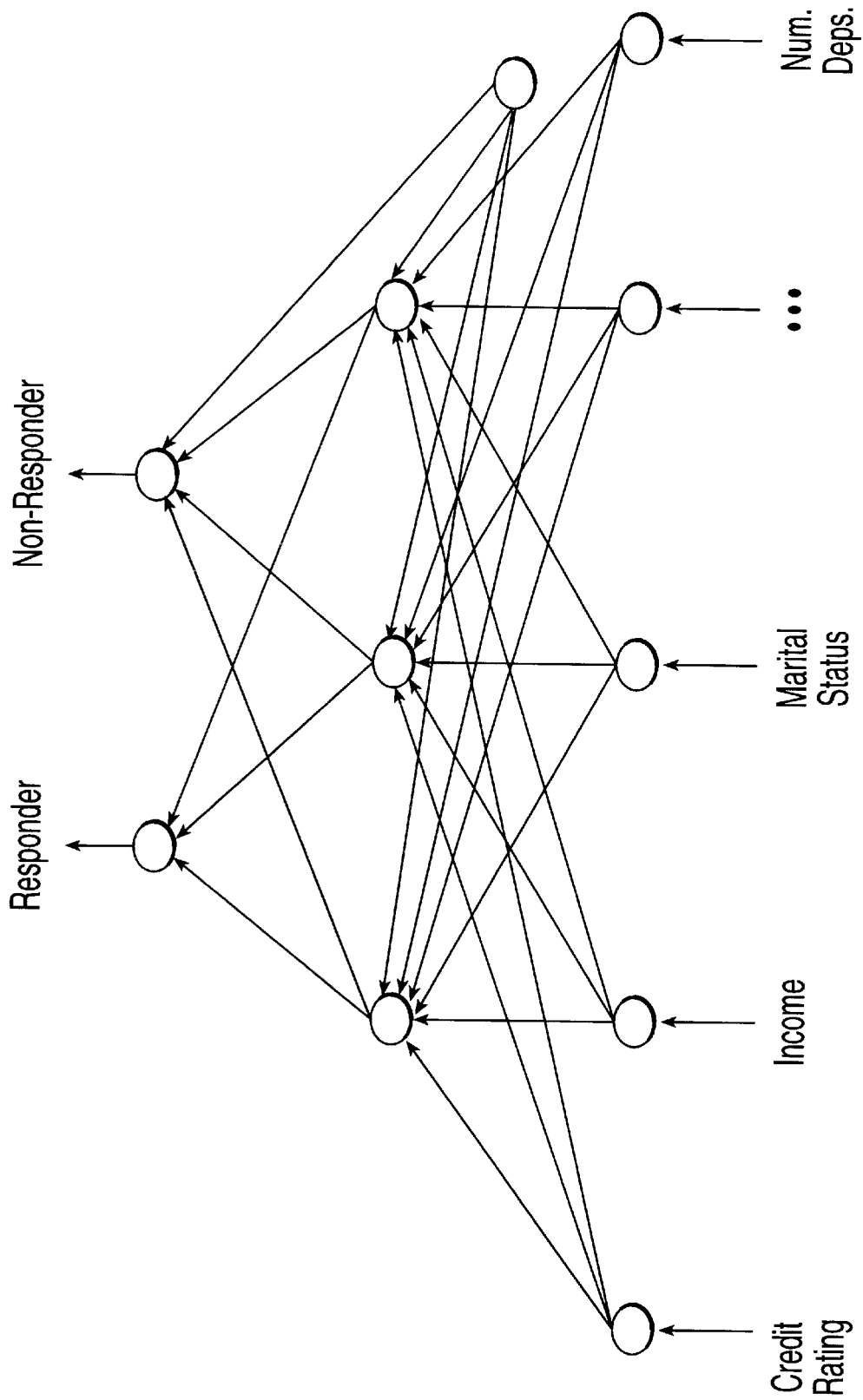
FIG. 2 shows one embodiment of a neural network used by the present invention.

The present invention is a neural network system and method for generating a prediction or classification. FIG. 1 shows a neural network 101, historical data 105 and preprocessing unit 107. The neural network 101 generates a prediction or classification from input data applied to its input layer. The inputs to the neural network are selected from the historical data. Assuming a classification system for projecting responders to a hypothetical bank's offer for home equity loans, FIG. 2, the historical data may consist of any number of factors or variables (i.e., credit rating, income, marital status, number of dependents, etc.) with two measurements or metrics or categories (i.e., responded to similar offers in the past, or did not respond to similar offers in the past). Data input to the neural network may be preprocessed by the preprocessing means 107 as shown in FIG. 1. Preprocessing can be used to normalize and re-cluster the input data.

The neural network 101 operates in four basic modes: training, testing, operation and retraining. During training the neural network is trained by use of a training means that presents the neural network with sets of training data. The training sets consist of historical data, and a desired output (i.e., actual, known, or correct output). The neural network generates a prediction or classification based on the historical data in the training set. This prediction or classification is then compared with the desired output in the training set. The difference between the prediction or classification generated by the neural network and the desired output is used to adjust the neural network weights. During training the neural network learns and adapts to the inputs presented to it. At the end of each training iteration, a test set is presented to the neural network. This test set also consists of data taken from the historical data, but the data in the test set does not duplicate any of the data in the training set. The prediction or classification resulting from the test data is then compared with the desired output from the test set and a variance is calculated. The variance is monitored at the end of each iteration to determine the point when the variance starts increasing. At the point where the variance starts increasing, training is halted. After the neural network is trained it is utilized to make a prediction or classification. This mode of operation is called operational mode. After the operational mode the neural network may be retrained with data collected from the current historical data or other historical data. Thus, the neural network making a prediction of responders and non-responders using historical data from one branch of a bank might be retrained using historical data from another branch of the bank. The neural network can then be used to make a classification of possible responders and non-responders for the new branch of the bank.

Advantages of Being Able to Dynamically Cease Training at or Near the Optimal Point Neural networks are trained by a training means that iteratively presents a training set to the neural network. The goal of the training means is to minimize the average sum-squared error over all of the training patterns. This goal is accomplished by propagating the error value back after each iteration and performing appropriate weight adjustments. After a sufficient number of iterations, the weights in the neural network begin to take on the characteristics or patterns in the data. Determining when, i.e. the iteration number at which, the neural network has taken on the appropriate set of characteristics has, prior to the method disclosed in the present invention, been a problem. In real world situations, where noise is embedded along with the patterns in the data, it is commonly recognized that the neural network fits the underlying pattern first and then begins to memorize the data. By memorizing the data the neural network is thus taking on the characteristics of the noise as well as the characteristics of the underlying pattern. This condition is referred to as over fitting or over training the network.

The overall goal is to train the neural network to the point where the underlying pattern has been detected but the noise has not yet been incorporated into the weights. However, prior to the present invention, this has been a difficult task. As a result, neural networks are commonly trained either to the point where the average sum-squared error on the training set is reduced to a given level; or a predetermined number of iterations has been exceeded.

This method of halting training is costly in several ways. Neural networks are frequently over trained, thus wasting valuable time while creating neural networks that are not as accurate as possible in their prediction or classifications. Furthermore, the developer of the neural network is unable to tell whether or not the neural network is over trained or under trained. Therefore the developer frequently wastes additional time in trying to tune the network without a good understanding of what is going on. The present invention discloses a method for overcoming these limitations.

DETAILED DESCRIPTION OF THE ELEMENTS

Neural Network

In order to appreciate the various aspects and benefits produced by the present invention a good understanding of neural network technology is required. For this reason the following section discusses neural network technology as applicable to the neural network of the present invention.

Artificial or computer neural networks are computer simulations of a network of interconnected neurons. A biological example of the of interconnected neurons is the human brain. It should be understood that the analogy to the human brain is important and useful in understanding the present invention. However, the neural networks of the present invention are computer simulations which provide useful predictions or classifications based on input data provided in specified forms.

A neural network can be defined by three elements: a set of nodes, a specific topology of weighted interconnections between the nodes and a learning law which provides for updating the connection weights. Essentially a neural network is a hierarchical collection of nodes (also known as neurons or nuerodes or elements or processing elements or preceptrons), each of which computes the results of an equation (transfer or activation function). The equation may include a threshold. Each node's activation function uses multiple input values but produces only one output value. The outputs of the nodes in a lower level (that is closer to the input data) can be provided as inputs to the nodes of the next highest layer. The highest layer produces the output(s). A neural network where all the outputs of a lower layer connect to all nodes in the next highest layer is commonly referred to as a feed forward neural network.

Figure 4:
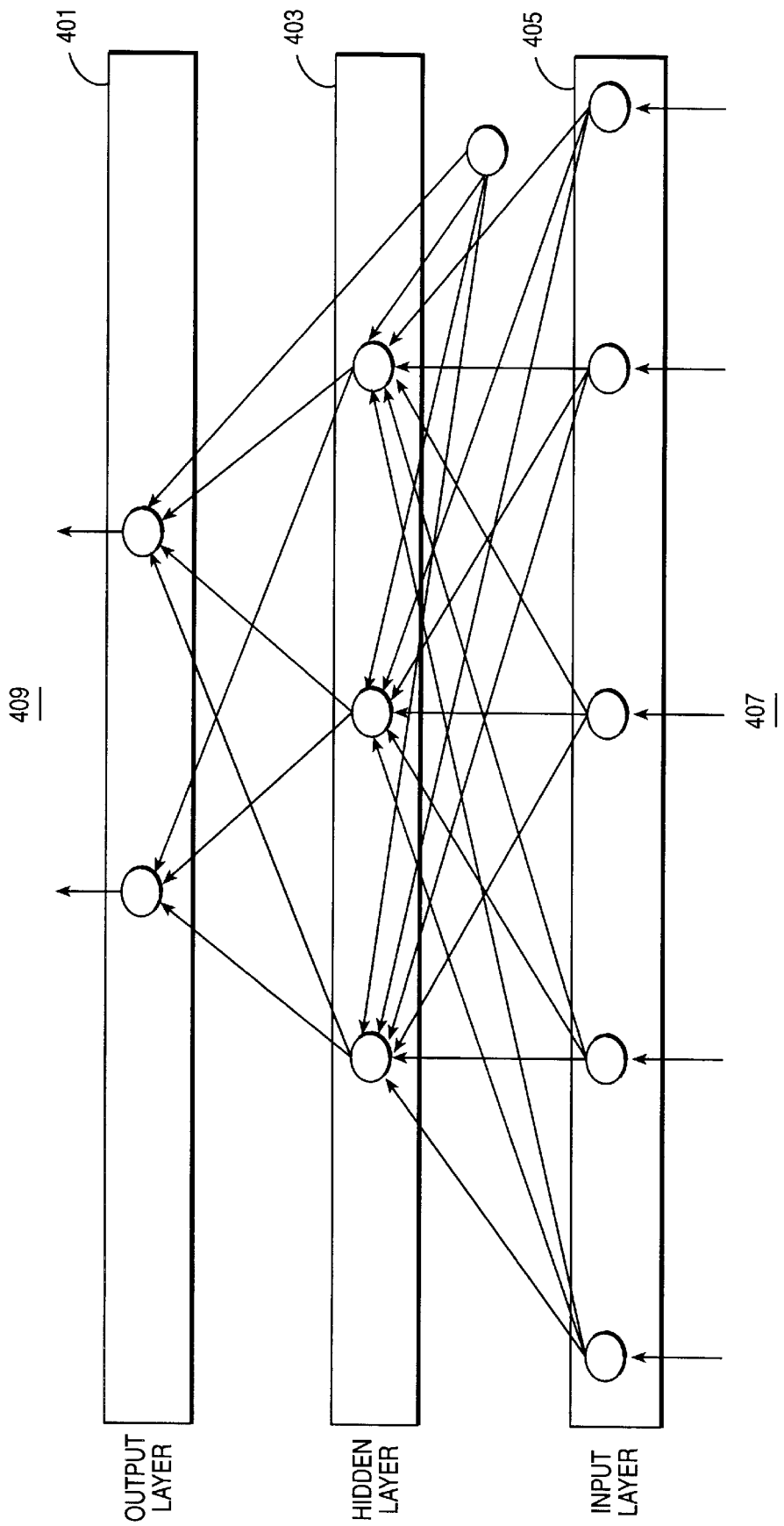
FIG. 4 shows a neural network with an input layer, a hidden layer and an output layer.

Referring now to FIG. 4, a representative example of a neural network is shown. It should be noted that the example shown in FIG. 4 is merely illustrative of one embodiment of a neural network. As discussed below other embodiments of a neural network can be used. The embodiment of FIG. 4 has an input layer 405, a hidden layer (or middle layer) 403 and a output layer 401. The input layer 405 includes a layer of input nodes which take their input values 407 from the external input (Historical data 105). The input data is used by the neural network to generate the output 409 (or prediction or classification 109). Even though the input layer 405 is referred to as a layer of the neural network, input layer 405 does not contain any processing nodes; instead it uses set of storage locations for input values.

The next layer is called the hidden or middle layer 403. A hidden layer is not required but, is usually used. It includes a set of nodes as shown in FIG. 4. The outputs from nodes of the input layer 405 are used as inputs to each node in the hidden layer 403. Likewise the outputs of nodes of the hidden layer 403 are used as inputs to each node in the output layer 401. Additional hidden layers can be used. Each node in these additional hidden layers would take the outputs from the previous layer as their inputs. Any number of hidden layers can be utilized.

The output layer 401 may consist of one or more nodes. As their input values they take the output of nodes of the hidden layer 403. The output(s) of the node(s) of the output layer 401 are the prediction(s) or classification(s) 409 produced by the neural network using the input data 407.

Each connection between nodes in the neural network has an associated weight. Weights determine how much relative effect an input value has on the output value of the node in question. Before the network is trained, random values are selected for each of the weights. The weights are changed as the neural network is trained. The weights are changed according to the learning law associated with the neural network.

When the inputs of each node of a layer are connected to all of the outputs of the nodes in the previous layer, the network is called fully connected. If all nodes use output values from nodes of a previous layer the network is a feed forward network. Note that if any node uses output values from nodes of a later level the network is said to have feedback. The neural network shown in FIG. 4 is a fully connected feed forward neural network.

A neural network is built by specifying the number arrangement and connection of the nodes of which it is made up. In a highly structured embodiment of a neural network, the configuration is fairly simple. For example, in a fully connected network with one middle layer (and of course including one input and one output layer), and no feedback, the number of connections and consequently the number of weights is fixed by the number of nodes in each layer. Such is the case in the example shown in FIG. 4.

In a neural network that has nodes having the same activation function, we need to know the number of nodes in each layer. This determines the number of weights and total storage needed to build the network. The modular aspect of the present invention takes advantage of this way of simplifying the specification of a neural network. Note that more complex networks require more configuration information, and therefore more storage.

The present invention contemplates other types of neural network configurations for use with a neural network. All that is required for a neural network is that the neural network be able to be trained and retrained so as to provide the needed prediction(s) or classification(s).

Referring to FIG. 4, a representative embodiment of a feed forward neural network will now be described. This is only illustrative of one way in which a neural network can function. Input data 407 is provided to input storage locations called input nodes in the input layer 405. The hidden layer 403 nodes each retrieve the input values from all of the inputs in the input layer 405. Each node has a weight with each input value. Each node multiples each input value times its associated weight, and sums these values for all of the inputs. This sum is then used as input to an equation (also called a transfer function or activation function) to produce an output or activation for that node. The processing for nodes in the hidden layer 403 can be preformed in parallel, or they can be performed sequentially. In the neural network with only one hidden layer 403 as shown in FIG. 4, the output values or activations would then be computed. For each output node, the output values or activations from each of the hidden nodes is retrieved. Each output or activation is multiplied by its associated weight, and these values are summed. This sum is then used as input to an equation which produces as its result the output data or forecast 409. Thus using input data 407, a neural network produces a prediction or classification or output 409 which is as a predicted value. An equivalent function can be achieved using analog means.

Nodes

Figure 8:
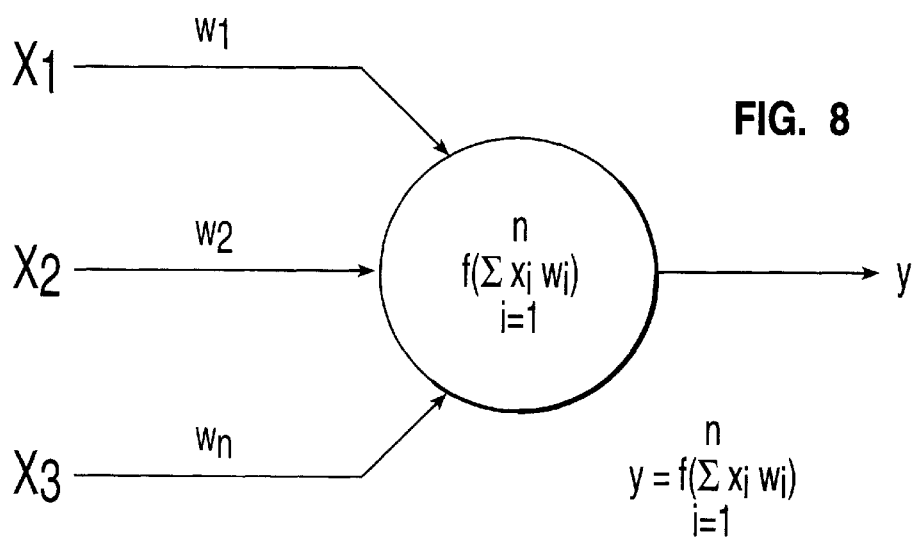
FIG. 8 depicts an embodiment of a node in a neural network.

A typical node is shown in FIG. 8. The output of the node is a nonlinear function of the weighted sum of its inputs. The input/output relationship of a node is often described as the transfer function or activation function. In most neural networks all the equations for all the nodes are the same (although the weights and inputs will differ). The activation function can be represented symbolically as follows:

$$y = f(\Sigma w_i x_i)$$

Figure 7A:
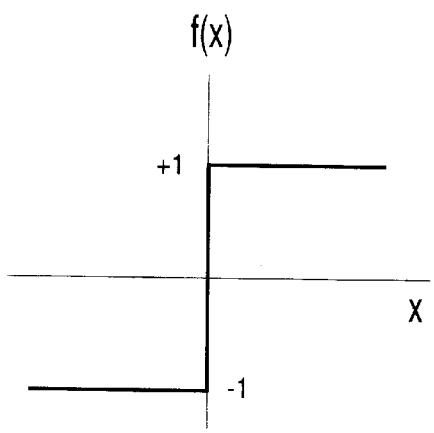
FIG. 7(a) shows a hard-limited activation function.
Figure 7B:
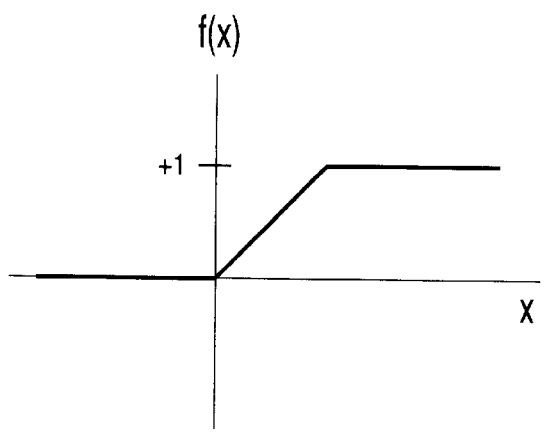
FIG. 7(b) shows a threshold logic activation function.
Figure 7C:
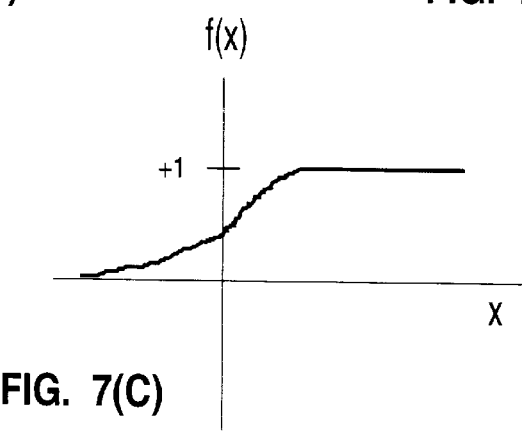
FIG. 7(c) shows a sigmoid activation function.

It is the weighted sum, $\Sigma w_i x_i$, that is inputted to the node's activation function. The activation function determines the activity level or excitation level generated in the node as a result of an input signal of a particular size. Any function may be selected as the activation function. However, for use with back propagation a sigmoidal function is preferred. The sigmoidal function is a continuous S-shaped monotonically increasing function which asymptotically approaches fixed values as the input approaches plus or minus infinity. Typically the upper limit of the sigmoid is set to +1 and the lower limit is set to either 0 or −1. A sigmoidal function is shown in FIG. 7(c) and can be represented as follows:

$$f(x) = 1/(1+e^{-(x+T)})$$

where x is weighted input (i.e., $\Sigma w_i x_i$) and T is a simple threshold or bias.

Figure 9:
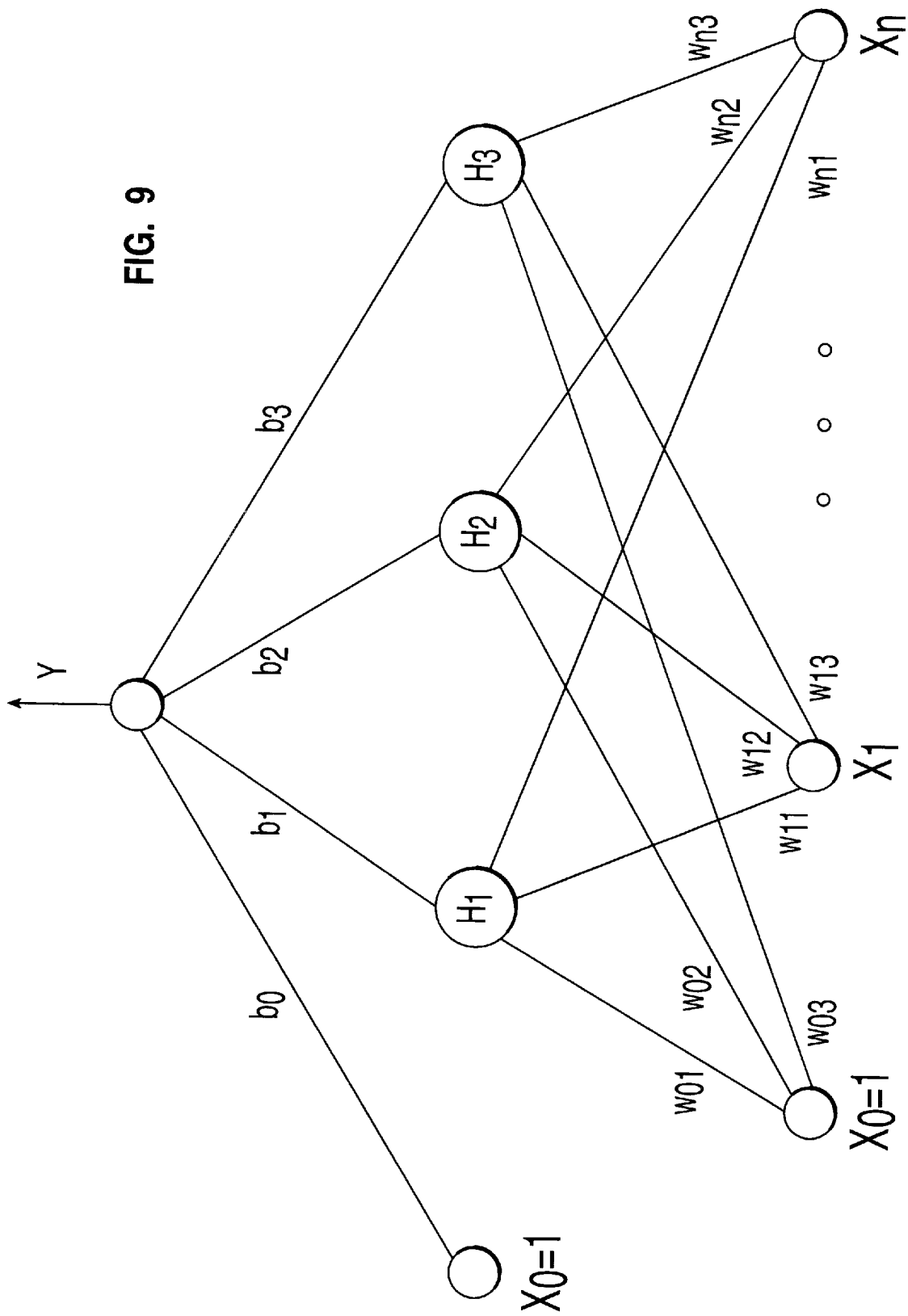
FIG. 9 shows a neural network model with its weights indicated.

Note that the threshold T in the above equation can be eliminated by including a bias node in the neural network. The bias node has no inputs and outputs a constant value (typically a +1) to all output and hidden layer nodes in the neural network. The weights that each node assigns to this one output becomes the threshold term for the given node. This simplifies the equation to $f(x) = 1/(1+e^{-X})$ where X is weighted input (i.e., $\Sigma w_i x_i$ where $x_0 = 1$ and $w_0$ is added as a weight.) FIG. 9 depicts a neural network with a bias node (i.e. $x_0 = 1$) as does FIG. 2 and FIG. 1.

Referring to the three layer feed-forward network in FIG. 9. This neural network has an input layer that distributes the weighted input to the hidden layer, which then transforms that input and passes it to an output layer, which performs a further transformation and produces an output (prediction or classification). In this example the hidden layer contains three nodes $H_1$, $H_2$, and $H_3$ as shown in FIG. 9. Each node acts as a regression equation by taking the sum of its weighted inputs as follows:

$$H_{i(IN)} = w_{0i} + w_{1i} x_1 \ldots + w_{ni} x_{bn}$$

where $(w_{0i}, \ldots, w_n)$ are the weights associated with each of the inputs $(x_0, \ldots, x_n)$, with $x_0 = 1$, for hidden node $H_i$.

Using a sigmoidal activation function for the hidden nodes, each hidden node transforms this input using a sigmoidal activation function such that:

$$H_{i(OUT)} = 1/(1+e^{-Hi\,(IN)})$$

where $H_{i(OUT)}$ is the output of hidden node $H_i$.

The output of each hidden node is multiplied by the weight of its connection to the output node (i.e., $b_i$). The results of these multiplications are summed to provide the input to the output layer node, thus the input of the activation function of the output node is defined as:

$$Y_{IN} = b_0 + b_1 H_{i(OUT)} + b_2 H_{2(OUT)} + b_3 H_{3(OUT)}$$

The forecast or predicted value, Y, is obtained by a sigmoidal transformation of this input:

$$Y = 1/(1+e^{-YIN})$$

The actual values of the connection weights $[(w_{01}, \ldots, w_{n1}), (W_{02}, \ldots, W_{n2}), (W_{03}, \ldots W_{n3})]$, $[b_0, b_1, b_2, b_3]$ are determined through training. See the section below that describes training of the neural network. Note that although a sigmoidal activation function is the preferred activation function, the present invention may be used with any other activation functions. FIG. 7(a) depicts a hard-limiter activation function. FIG. 7(b) depicts a threshold logic activation function. FIG. 7(c) depicts a sigmoidal activation function. Other activation functions may be utilized with the present invention as well.

Inputs

A neural network accepts input data via its input layer. In the case of the present invention this input takes the form of historical data. Historical data may be grouped by factor or variable. For instance, in the case where a bank wants to determine which of its customers are likely to respond to an offer for a home equity loan, the customer's income may be a likely factor to consider. Thus, the factor of the customer's income may contain individual values or items such as salary, variable pay, royalties, rents, commissions, etc. Other factors or variables may be credit rating, marital status, etc. A neural network of the present invention may use zero, one, or all of the data items associated with a particular factor.

The selection of which factors and which data items to input to the neural network is a decision for the system designer. The particular data items selected can be changed at a later time if less than desirable results are obtained. The system designer can use information obtained from analysis of the historical data and experience obtained during training of the neural network to select an appropriate set of factors and associated data items. The system designer may have to experiment with factors and data items to select the most appropriate set.

For convenience in analyzing neural network performance and in the creation of the training sets the historical data may be stored in a computer database. A relational or object oriented database is suitable for use with the present invention. There are many commercial available databases suitable for use with the present invention.

Training

As was stated previously, each connection between nodes in the neural network has an associated weight. Weights determine how much relative effect an input value has on the output value of the node in question. Before the network is trained, random values are selected for each of the weights. The weights are changed as the neural network is trained. The weights are changed according to the learning law associated with the neural network.

The weights used in a neural network are adjustable values which determine (for any given neural network configuration) the prediction or classification for a given set of input data. Neural networks are superior to conventional statistical models for certain tasks because neural networks can adjust these weights automatically and thus they do not require that the weights be known a priori. Thus, neural networks are capable of building the structure of the relationship (or model) between the input data and the output data by adjusting the weights, whereas in a conventional statistical model the developer must define the equation(s) and the fixed constant(s) to be used in the equation.

Figure 3:
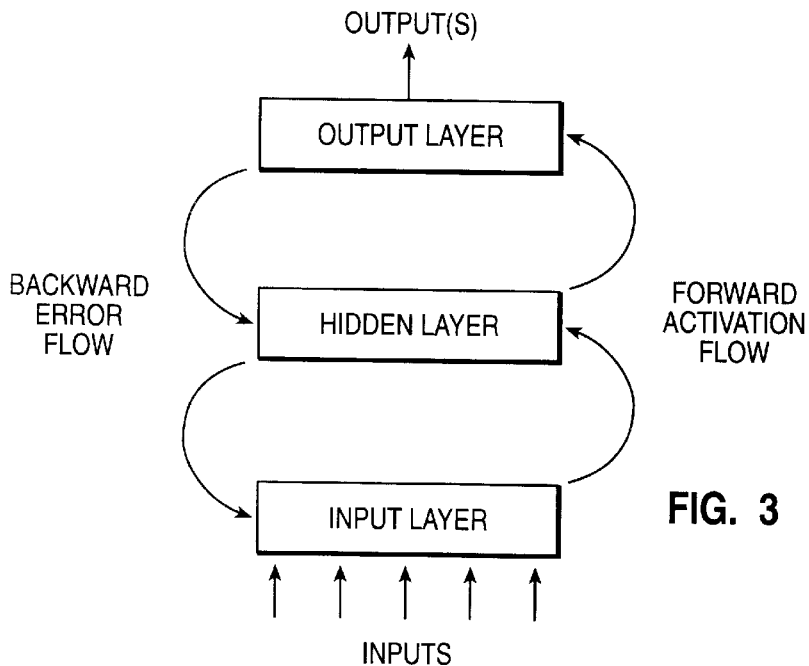
FIG. 3 shows information flow between the layers of a neural network while using back propagation for training.
Figure 6:
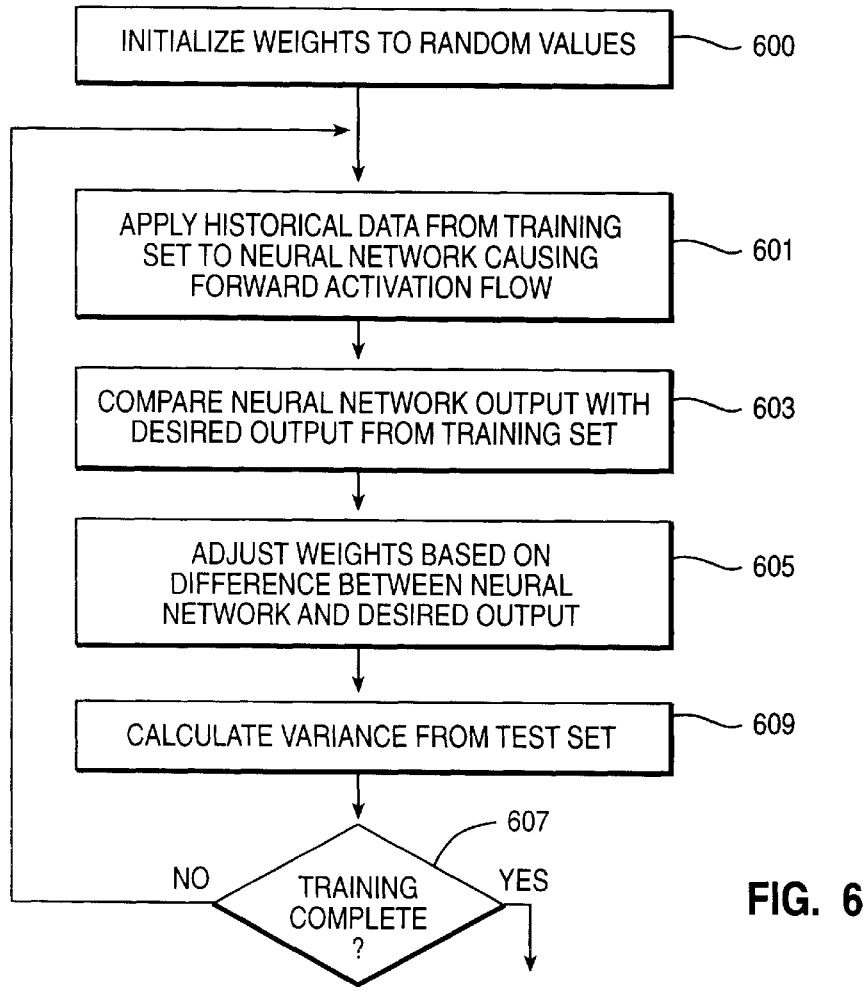
FIG. 6 shows the steps required for training the neural network.

The adjustment of weights in a neural network is commonly referred to as training or learning. Training a neural network requires that training data be assembled for use by the training means. The training means then implements the steps shown in FIG. 6 and described below. Referring now to FIG. 6, the present invention discloses a particular approach for training the neural network. In step 600 the weights are initialized to random values. When retraining the neural network step 600 may be skipped so that training begins with the weights computed for the neural network from the previous training session(s). In step 601 a set of input data is applied to the neural network. As described previously, this input causes the nodes in the input layer to generate outputs to the nodes of the hidden layer, which in turn generates outputs to the nodes of the output layer which in turn produces the prediction or classification. This flow of information from the input nodes to the output nodes is typically referred to as forward activation flow. Forward activation is depicted on the right side of FIG. 3.

Returning now to FIG. 6, associated with the input data applied to the neural network in step 601 is a desired (actual or known or correct) output value. In step 603 the prediction or classification produced by the neural network is compared with the desired output. The difference between the desired output and the forecast produced by the neural network is referred to as the error value. This error value is then used to adjust the weights in the neural network as depicted in step 605.

One suitable approach for adjusting weights is called back propagation (also commonly referred as the generalized delta rule). Back propagation is a supervised learning method in which an output error signal is fed back through the network, altering connection weights so as to minimize that error. Back propagation uses the error value and the learning law to determine how much to adjust the weights in the network. In effect, the error between the forecast output value and the desired output value is propagated back through the output layer and through the hidden layer(s).

Back propagation distributes the overall error value to each of the nodes in the neural network, adjusting the weights associated with each node's inputs based on the error value allocated to it. The error value is thus propagated back through the neural network. This accounts for the name back propagation. This backward error flow is depicted on the left hand side of FIG. 3.

Once the error associated with a given node is known, the node's weights can be adjusted. One way of adjusting the weights for given node is as follows:

$$W_{new}=W_{old}+\beta EX$$

where E is the error signal associated with the node, X represents the inputs (i.e., as a vector), $W_{old}$ is the current weights (represented as a vector), and $W_{new}$ is the weights after adjustment, and $\beta$ is a learning constant or rate. $\beta$ can be thought of as the size of the steps taken down the error curve. Other variations of this method can be used with the present invention. For example the following:

$$W_{new}=W_{old}+\beta EX+\alpha(W_{new}-W_{old})_{prev}$$

includes a momentum term, $a(W_{new}-W_{old})_{prev}$, where a is a constant that is multiplied by the change in the weight from a previous input pattern.

According to the back propagation method, which is illustrative of training methods that can be used for the neural network, an error value for each node in the hidden layer is computed by summing the errors of the output nodes each multiplied by its associated weight on the connection between the hidden node in the hidden layer and the corresponding output nodes in the output layer. This estimate of the error for each hidden layer node is then used in the manner described above to adjust the weights between the input layer and the hidden layer.

It can thus be seen that the error between the output data and the training input data is propagated back through the network to adjust the weights so that the error is reduced. This process is iteratively repeated with the training data 88 until training is complete. As shown in step 607 a test is used to determine whether training is complete or not. Commonly this test simply checks that the error value be less than a certain threshold over a certain number of previous training iterations, or it simply ends training after a certain number of iterations.

A preferred technique is to use a set of testing data and measure the error generated by the testing data. The testing data could be generated so that it is mutually exclusive of the data used for training. Currently, training is considered complete, if the error resulting from application of the testing data is less than a predetermined amount. Otherwise training continues. The novel aspect of this invention is that a predetermined lower bound on the error value is not used, but instead the neural network is allowed to train until the optimum point for cessation of training is reached. The optimum training point is that point in the training of a neural network where the variance 609 of the neural network prediction or classification has reached a minimum with respect to known results from a test set taken from historical data. Note that when test data is used to determine when training is completed the weights are not adjusted as a result of applying the testing data to the neural network. That is the test data is not used to train the network.

In summary to train the newly configured neural network the weights are usually initialized by assigning them random values, step 600. During training, the neural network uses its input data to produce predicted output data as described above in step 601. These output data values are used in combination with training input data to produce error data, step 603. The error data is the difference between the output from the output nodes and the target or actual data. These error data values are then propagated back through the network through the output node(s) and used in accordance with the activation function present in those nodes to adjust the weights, step 605. Calculation of the variance, between the neural network's prediction or classification on known test data and the desired result from the known test data, is performed, step 609. A test on the variance is used to determine if training is complete or more training is required, step 607.

More detail on training and the back propagation method in particular can be found in Parallel Distributed Processing, Explorations in the Microstructure of Cognition, by David E. Rumelhart and James L. McClelland, The MIT Press, to Cambridge, Mass. USA, 1986, in Explorations In Parallel Distributed Processing, A Handbook of Models, Programs, and Exercises, by James L. McClelland and David E. Rumelhart, The MIT Press, Cambridge, Mass., 1988, and in Neural Network PC Tools: A Practical Guide, by eds. Eberhart and Dobbins, Academic Press, Inc., 1990, which are incorporated herein by reference.

Note that although the present invention has been described with respect to the basic back propagation algorithm other variations of the back propagation algorithm may be used with the present invention as well. Other learning laws may also be used. For instance, reinforcement learning. In reinforcement learning a global reinforcement signal is applied to all nodes in the neural network. The nodes then adjust their weights based on the reinforcement signal. This is decidedly different from back propagation techniques which essentially attempt to form an error signal at the output of each neuron in the network. In reinforcement learning there is only one error signal which is used by all nodes.

Training and Testing Data

Figure 5:
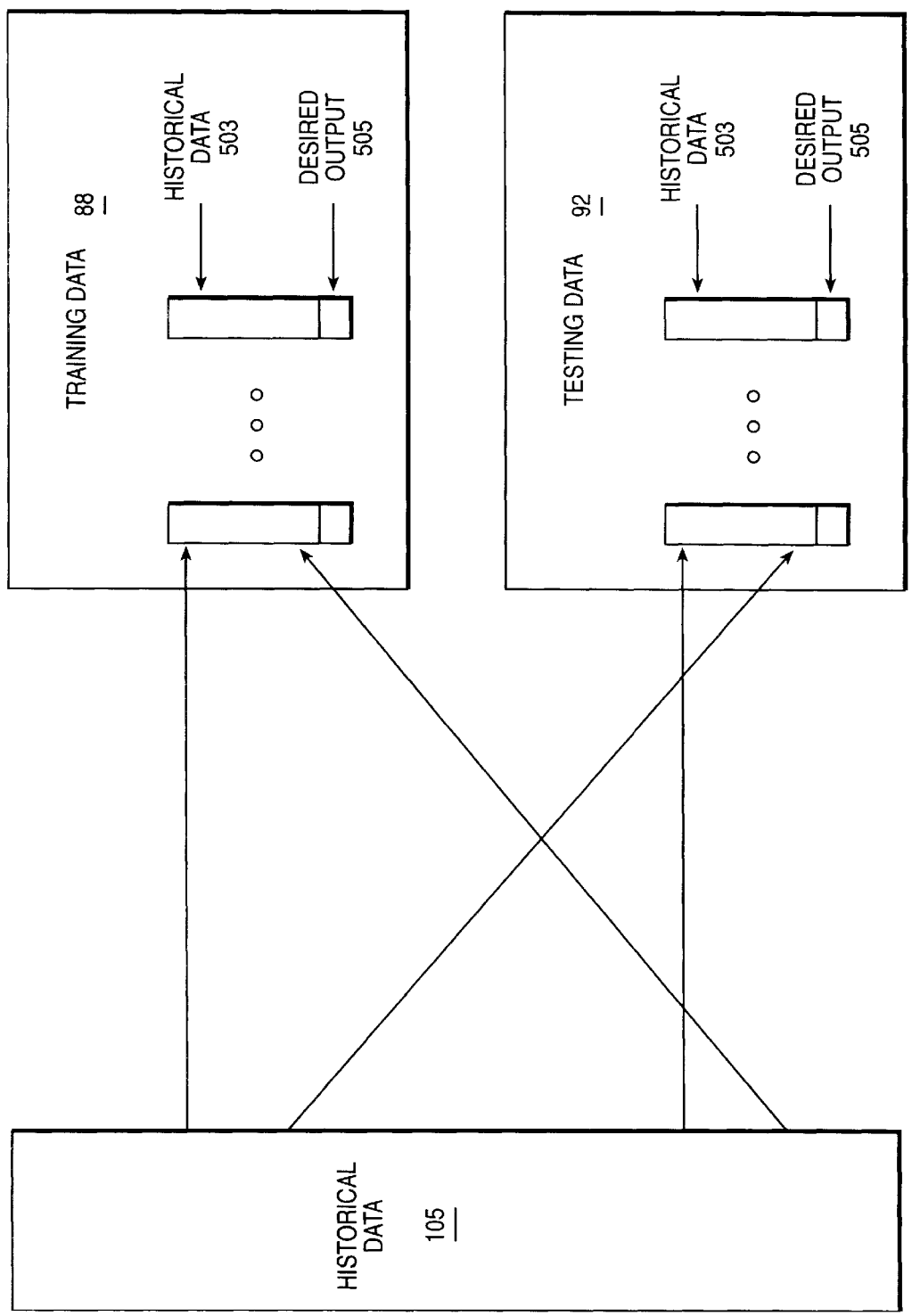
FIG. 5 depicts the relationship between training data, testing data, and historical data.

The neural network is trained by repeatedly presenting it with the training data 88. Turning now to FIG. 5, each training set has a set of historical data items 503 and an associated desired output data value(s) 505 (i.e., the actual or correct or known value(s)). The testing set 92 is identical to the training set 88 in structure, but the testing set is distinctly different from the training set in that it does not contain any of the same data records as the training set. As described below, a neural network utility program can use a historical database to automatically create the desired training and testing sets.

For ease of analysis and creation of the training and testing sets, data is usually stored in a database as historical data. A random sample, without replacement, is usually taken from the historical data 105 in the database. This random sample of records is then divided into two or even three separate data sets. One of these data sets is used as the training set, another is used as the testing set; and if three data sets have been defined, the third is used for a final test after the optimum training point and its associated neural network have been determined.

Preprocessing

The preprocessing function 107 is depicted in FIG. 1. Preprocessing of the input values may be performed as the inputs are being applied to the neural network or the inputs may be preprocessed and stored as preprocessed values in the historical data store. If preprocessing is performed it may consist of one or more steps. For instance, classical back propagation has been found to work best when the input data is normalized either in the range [−1, 1] or [0, 1]. Note that normalization is performed for each factor of data. For example, each of the factors in the bank home equity loan offer neural network, FIG. 2 (i.e., income, credit rating, etc.) would be separately normalized. The normalization step may also be combined with other steps such as taking the natural log of the input. Thus preprocessing may consist of taking the natural log of each input and normalizing the input over some interval. The logarithmic scale compacts large data values more than smaller values, When the neural net contains nodes with a sigmoidal activation function better results are achieved if the data is normalized over the interval [0.2, 0.8]. Normalizing to range [0.2, 0.8] uses the heart of the sigmoidal activation function. Other functions may be utilized to preprocess the input values.

Calculating the Variance from Test Set

Figure 11:
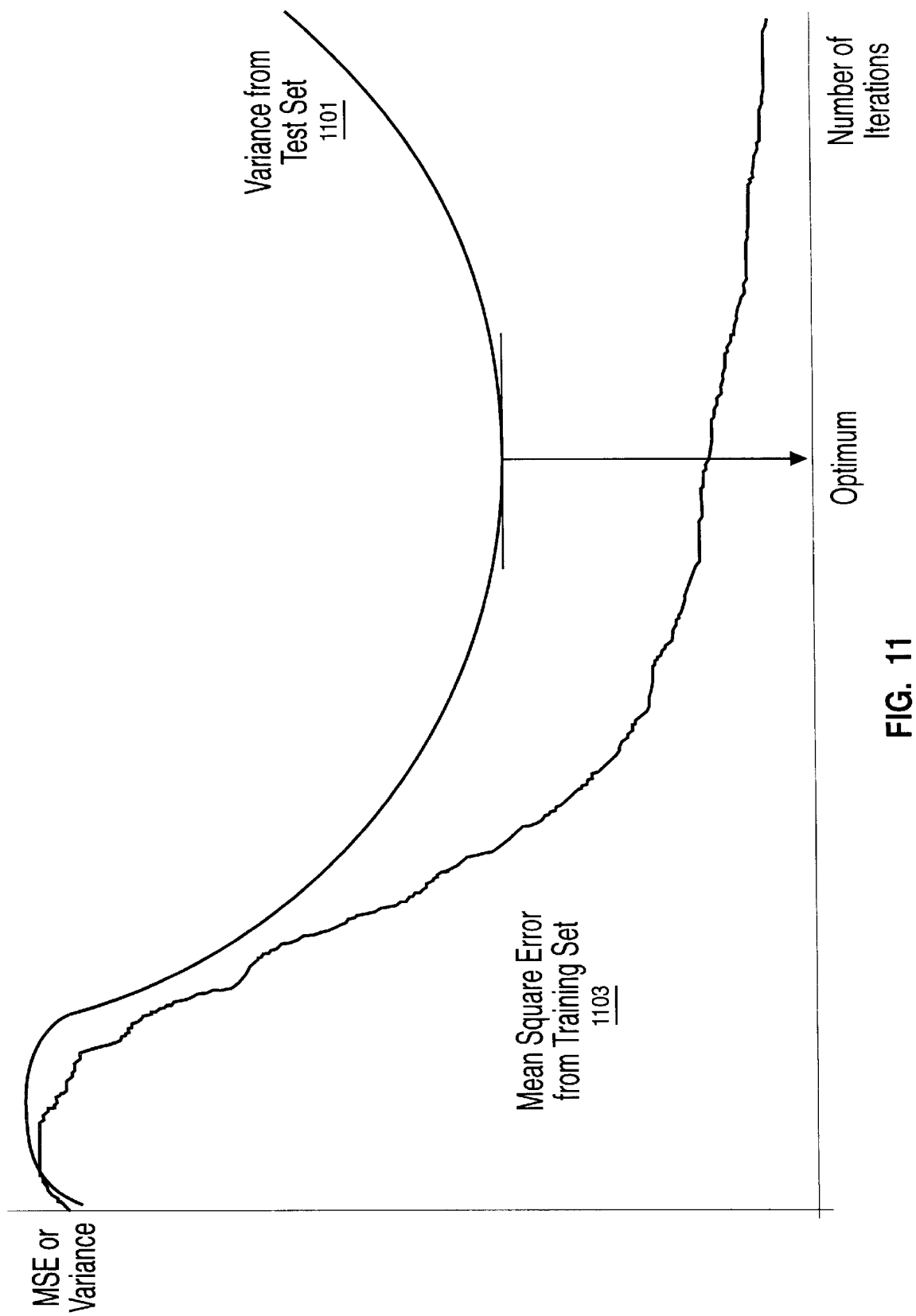
FIG. 11 shows the contrast of the mean squared error as it is related to the variance from a test set.

Referring now to FIG. 5, FIG. 6, and FIG. 11. Calculating the variance 609, of the neural network's prediction or classification, from the known result in a test set 92; and using this variance to determine the optimum point for ceasing further training constitutes the novel aspect of this invention. This novel aspect is now described. After the weights have been adjusted 605, the neural network is presented with a test set 92. A variance is then calculated between the neural network's prediction or classification and the desired output 505. This variance is then used to determine if training has achieved the optimal response from the given neural network, step 607, in which case, training should be halted.

Two questions associated with achieving the optimal result are 1) what constitutes the variance, and 2) how is it determined that the optimal variance has been achieved. In FIG. 11 two curves, that are both a function of the number of iterations that the neural network has been trained, are presented. One is the mean square error 1103 derived from the training set, and the other is the variance 1101 derived from the test set.

The goal of the neural network, while it is training, is to minimize the mean square error 1103 by adjusting the neural network weights after each training iteration. As a result, the neural network fits the training set with a greater and greater degree of accuracy with each iteration, while the mean square error curve 1103 asymptotically attempts to approach zero. Thus, it is, possible for the neural network to fit a given pattern to any arbitrarily chosen degree of accuracy. This, however, is not the overall goal of using a neural network approach to make predictions or classifications. The overall goal is to produce a neural network that will generalize on other sets of data that are presented to it. Therefore, there is a point in the iterative process when the neural network has learned the underlying pattern in the training data and is subsequently memorizing the training data including any noise that it may contain.

This over-fitting or over-training problem can be avoided if the neural network trains on the training data 88, but measures its ability to generalize on another set of data, called the testing data 92. This is accomplished by calculating the variance between the neural network's prediction or classification and the desired (actual or known or correct) value(s) from the testing data 92.

The variance can be any function that the system developer finds to be most appropriate for the problem at hand.

For example, it could be the mean square error on the testing data 92, the statistical variance in the case of prediction problems with continuous variables, the chi-square test in the case of classification problems, or simply the number of incorrectly determined responses in the case of classification problems. Those skilled in the art will quickly understand that many different methods of calculating the variances can be used with equal results without departing from the spirit and scope of the invention. Step 609 in FIG. 6, represents the point, in the iterative process, at which the variance is calculated.

The iteration at which the variance reaches a minimum is the optimum point 1101, for any given set of testing data 92, to cease training. At this point the neural network has finished learning the pattern(s) in the training set and is beginning to over-fit or memorize the data. Just as the variance itself can be calculated by a variety of means, the optimal point to cease training can also be calculated by a variety of means. It is the point at which the variance ceases to decrease with further training and begins to increase instead. For example, this inflection point can be determined most simply by observing that the variance has not made a new minimum within some given number of iterations, more complicatedly by performing a running linear regression on the variance for some number of iterations in the past and observing when the slope of the line becomes positive, or by computing a moving average and observing when the average starts to increase. Those skilled in the art will be able to quickly propose other methods for determining the minimum without departing from the spirit and scope of the invention. Step 609 of FIG. 6 is the point in the iterative process where the calculations to determine the minimum are carried out.

As a practical matter, the neural network weights may be saved for an appropriate number of iterations in the past. These weights being indexed by the iteration number at which they were achieved. When it has been determined that the inflection point has been reached the iteration number with the lowest value of the variance is used to retrieve the optimum neural network weights.

SPECIFIC EXAMPLES AND EMBODIMENTS

Discussed above has been the preferred method of operation of the present invention. Discussed in this Section are the preferred structures (architecture) of the present invention. However, it should be understood that in the description set forth above, the modular structure (architecture) of the present invention was also discussed in connection with the operation. Thus, certain portions of the structure of the present invention have inherently been described in connection with the description set forth above.

The preferred embodiment of the present invention comprises one or more software systems. In this context, software system is a collection of one or more executable software programs, and one or more storage areas, for example, RAM or disk. In general terms, a software system should be understood to comprise a fully functional software embodiment of a function, which can be added to an existing computer system to provide new function to that computer system.

Software systems generally are constructed in a layered fashion. In a layered system, a lowest level software system is usually the computer operating system which enables the hardware to execute software instructions. Additional layers of software systems may provide, for example, database capability. This database system provides a foundation layer on which additional software systems can be built. For example, a neural network software system can be layered on top of the database. Also, a prediction and classification software system can be layered on top of the historical database system.

A software system is thus understood to be a software implementation of a function which can be assembled in a layered fashion to produce a computer system providing new functionality. Also, in general, the interface provided by one software system to another software system is well defined. It should be understood in the context of the present invention that delineations between software systems are representative of the preferred implementation. However, the present invention may be implemented using any combination or separation of software systems.

The database can be implemented as a stand-alone software system which forms a foundation layer on which other software systems, (e.g., the neural network, and training means) can be layered. Such a foundation layer database system can support many functions in a prediction or classification environment. For example, the database can serve as a foundation for software which provides graphical displays of historical data, training data, and testing data for use by the system designer. A database can also provide data to data analysis and display software which can be used for analyzing the operation of the neural network. Such a foundation layer database system will often contain a large number of historical data, training data sets, testing data sets, error data and results.

The database, as used in the present invention, can be implemented using a number of methods. For example, the database can be built as a random access memory (RAM) database. The historical database can also be implemented as a disk-based database, or as a combination of RAM and disk databases. The present invention contemplates any computer or analog means of performing the functions of the database. These include the use of flat files, relational data bases, object oriented databases or hierarchical data bases to name a few.

The neural network retrieves input data and uses this retrieved input data to output a prediction or classification. The output data (i.e., the forecast) can be supplied to the database for storage or can be sent to other software systems such as decision making or planning applications or it can be shown on a display. The input data can be obtained from the database.

It should be understood that neural networks, as used in the present invention, can be implemented in any way. For example, the preferred embodiment uses a software implementation of a neural network. It should be understood, however, that any form of implementing a neural network can be used in the present invention, including physical analog forms. Specifically, as described below, the neural network may be implemented as a software module in a computer system. Furthermore, the neural network of the present invention may implemented on one computer system during training and retraining and another during operational mode. Thus a neural computer, using parallel processing, could be utilized during the computationally intensive training stage and then once the weights have been adapted the weights and the neural network could be embodied in a PC or PDA or workstation to generate the required forecast using the required operational input data. Likewise the neural network might be trained on a single processor and then distributed to a number of parallel processors in the operational mode.

It should also be understood with regard to the present invention that software and computer embodiments are only one possible way of implementing the various elements in the systems and methods. As mentioned above, the neural network may be implemented in analog or digital form. It should be understood, with respect to the method steps as described above for the functioning of the systems as described in this section, that operations such as computing or determining (which imply the operation of a digital computer) may also be carried out in analog equivalents or by other methods.

The neural network, training means and database may, in a variant of the present invention, be implemented as a single software system. This single software system could be delivered to a computer installation in which no historical database previously existed, to provide the functions of the present invention. Alternately, a neural network configuration function (or program) could also be included in this software system. A neural network configuration module can be connected in a bi-directional path configuration with the neural network. The neural network configuration module is used by the user (developer) to configure and control the neural network in a fashion as discussed above in connection with the step and module or in connection with the user interface discussion contained below.

The neural network must contain a neural network model. As stated above, the present invention contemplates all presently available and future developed neural network models and architectures. The neural network model can have a fully connected aspect, or a no feedback aspect. These are just examples. Other aspects or architectures for the neural network model are contemplated.

The neural network must have access to input data and training data and access to locations in which it can store output data and error data. One embodiment of the present invention uses an approach where the data is not kept in the neural network. Instead, data pointers are kept in the neural network which point to data storage locations (e.g., a working memory area) in a separate software system. These data pointers, also called data specifications, can take a number of forms and can be used to point to data used for a number of purposes. For example, input data pointer and output data pointer must be specified. The pointer can point to or use a particular data source system for the data, a data type, and a data item pointer. Neural network must also have a data retrieval function and a data storage function. Examples of these functions are callable routines, disk access, and network access. These are merely examples of the aspects of retrieval and storage functions. The preferred method is to have the neural network utilize data in the database. The neural network itself can retrieve data from the database or another module could feed data to the areas specified by the neural networks pointers.

The neural network also needs to be trained, as discussed above. As stated previously, any presently available or future developed training method is contemplated by the present invention. The training method also may be somewhat dictated by the architecture of the neural network model that is used. Examples of aspects of training methods include back propagation, generalized delta, and gradient descent, all of which are well known in the art.

The neural network needs to know the data type that is being specified. This is particularly important in an historical database since it can provide more than one type of data. Finally, the data item pointer must be specified. It is thus seen that neural network can be constructed so as to obtain desired input data or to provide output data in any intended fashion. In the preferred embodiment of the present invention, this is all done through menu selection by the user (developer) using a software based system on a computer platform. The present invention can utilize a template and menu driven user interface, which allows the user to configure, reconfigure and operate the present invention. This approach makes the present invention very user friendly. It also eliminates the need for the user to perform any computer programming, since the configuration, reconfiguration and operation of the present invention is carried out in a template and menu format not requiring any actual computer programming expertise or knowledge. There are several aids for the development of neural networks commonly available. For example, the IBM Neural Network Utility (NNU) and Intelligent Miner (IM) provide access to a number of neural paradigms (including back propagation) using a graphical user interface (GUI) as well as an application programmer's interface (API) which allows the network to be embedded in a larger system. The NNU GUI runs on Intel-based machines using OS/2 or DOS/Windows and on RISC/6000 machines using AIX. The API is available not only on those platforms but also on a number of mainframe platforms, including VM/CMS and OS/400. Other platforms such as Windows are contemplated. Available hardware for improving neural network training and run-time performance includes the IBM Wizard, a card that plugs into MicroChannel buses. Other vendors with similar software and/or hardware products include NeuralWare, Nestor and Hecht-Nielsen Co.

Figure 10:
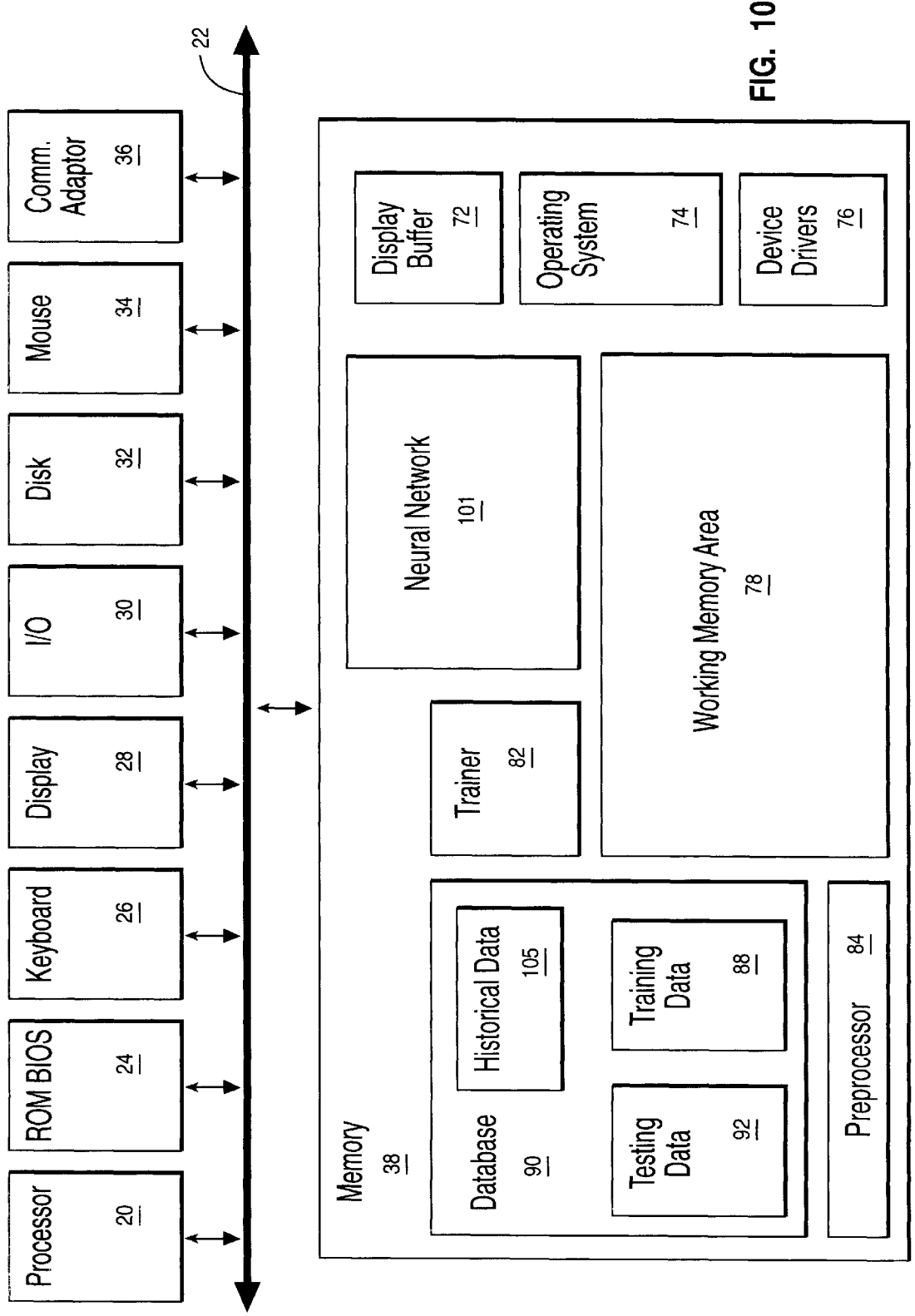
FIG. 10 shows one embodiment of the present invention.

The preferred embodiment of this invention comprises a set of software systems for determining the optimum point at which to ceased training in a neural network as shown in the architectural block diagram of FIG. 1. FIG. 10 shows one embodiment of the present invention and includes a processor connected by means of a system bus 22 to a read only memory (ROM) 24 and memory 38. Also included in the computer system in FIG. 10 are a display 28 by which the computer presents information to the user, and a plurality of input devices including a keyboard 26, mouse 34 and other devices that may be attached via input/output port 30. Other input devices such as other pointing devices or voice sensors or image sensors may also be attached. Other pointing devices include tablets, numeric keypads, touch screen, touch screen overlays, track balls, joy sticks, light pens, thumb wheels etc. The I/O 30 can be connected to communications lines, disk storage, input devices, output devices or other I/O equipment. The memory 38 includes a display buffer 72 that contains pixel intensity values for a display screen. The display 28 periodically reads the pixel values from the display buffer 72 displaying these values onto a display screen. The pixel intensity values may represent grey-levels or colors.

The memory 38 includes a database 90, trainer 82, neural network 101, preprocessor 84. The database 90 as shown contains historical data 105, training data, testing data 92. The database may also include results from operational, training or retaining modes of using the neural network. These elements have been described in detail above.

Also shown in memory 38 is the operating system 74. Examples of operating systems include AIX, OS/2, and DOS. Other elements shown in memory 38 include device drivers 76 which interpret the electrical signals generated by devices such as the keyboard and mouse. A working memory area 78 is also shown in memory 38. The working memory area 78 can be utilized by any of the elements shown in memory 38. The working memory area can be utilized by the neural network 101, trainer 82, the operating system 74 and other functions. The working memory area 78 may be partitioned amongst the elements and within an element. The working memory area 78 may be utilized for communication, buffering, temporary storage, or storage of data while a program is running.

ALTERNATIVES AND CLOSING

While the present invention has been described using a bank home equity loan offer as a basis for classification into potential responders and non-responders, the present invention is not limited to this particular application. The present invention may be utilized in any number of fields including but not limited to: weather forecasting, financial forecasting, sales forecasting, human resource forecasting, computer resource utilization, logistics, and natural resource utilization.

While the invention has been described in detail herein in accord with certain preferred embodiments thereof, modifications and changes therein may be effected by those skilled in the art. Accordingly, it is intended by the appended claims to cover all such modifications and changes as fall within the true spirit and scope of the invention.

What is claimed is:

1. A computer implemented process for training neural networks to their optimal training point, the process comprising the steps of:

initializing neural network node weight values;

dividing a set of neural network training data into a training set and a test set, said training data having input and output values;

applying said training set to said neural network and adjusting said weight values in response to an output of said applying said training set;

applying said test set to said neural network with said adjusted weight values;

calculating an output variance based upon said test set and an output of said applying said test set;

testing said variance by
   i) storing a first variance as a minimum variance;
   ii) comparing each calculated variance with said minimum variance;
   iii) replacing said minimum variance with said calculated variance if said calculated variance is less than said stored minimum variance;
   iv) storing a variance trend wherein said variance trend comprises a user determined number of past calculated variance values; and
   v) signaling that said variance has reached a minimum if said variance trend is increasing from said stored minimum variance; and in response to said testing step, terminating said training if said testing indicates said variance has reached a minimum, or repeating the applying said training set, applying said test set, calculating an output variance and testing said variance steps if said variance has not reached a minimum.

2. The process of claim 1, wherein said variance trend comprises a linear regression of said calculated variance values.

3. The process of claim 1, wherein said variance is determined by calculating a means square error between the test set output produced by the trained neural network and the original test set output values.

4. A computer program product having a computer readable medium having computer program logic recorded thereon for ceasing training of a neural network at an optimum training point, said computer program product comprising:

computer program product means having computer readable means for setting an initial node weight for each of a plurality of nodes comprising a neural network;

computer program product means having computer readable means for receiving a training data set having input values and output values;

computer program product means having computer readable means for dividing said training data into a training set and a test set;

computer program product means having computer readable means for iteratively performing the following steps:

computer program product means having computer readable means for applying said training set to said neural network and adjusting said node weights in response to an output of said neural network;

computer program product means having computer readable means for applying said test set to said neural network to create a network output;

computer program product means having computer readable means for calculating a variance between said network output and said test set output values;

computer program product means having computer readable medium for determining a variance trend wherein said variance trend comprises a user determined number of past calculated variance values;

computer program product means having computer readable medium for causing a computer system to signal optimal training when said variance trend passes a minimum.

\* \* \* \* \*